US010933786B2

(12) United States Patent
Krause et al.

(10) Patent No.: US 10,933,786 B2
(45) Date of Patent: Mar. 2, 2021

(54) FIXED ATTACHMENT FOR HOG RING TIE-DOWN TRENCH

(71) Applicant: LEAR CORPORATION, Southfield, MI (US)

(72) Inventors: Timothy Krause, Wolverine Lake, MI (US); Mark Duso, Grosse Point Farms, MI (US); Josh A. Van Bergen, Warren, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 16/162,484

(22) Filed: Oct. 17, 2018

(65) Prior Publication Data

US 2019/0160991 A1 May 30, 2019

Related U.S. Application Data

(60) Provisional application No. 62/590,886, filed on Nov. 27, 2017.

(51) Int. Cl.
*B60N 2/72* (2006.01)
*B60N 2/70* (2006.01)
*B60N 2/58* (2006.01)

(52) U.S. Cl.
CPC ............. *B60N 2/72* (2013.01); *B60N 2/5825* (2013.01); *B60N 2/7017* (2013.01); *B60N 2/7035* (2013.01)

(58) Field of Classification Search
CPC ...... B60N 2/72; B60N 2/7017; B60N 2/7035; B60N 2/7005
USPC ............................ 297/452.6, 452.58, 452.59
See application file for complete search history.

(56) References Cited

U.S. PATENT DOCUMENTS

| 5,964,017 | A | * | 10/1999 | Roberts ................ B60N 2/5825 24/297 |
| 6,838,155 | B2 | | 1/2005 | Cappucci et al. |
| 7,077,473 | B2 | | 7/2006 | Demain et al. |
| 7,487,575 | B2 | | 2/2009 | Smith |

(Continued)

FOREIGN PATENT DOCUMENTS

| CN | 102753058 A | 10/2012 |
| CN | 103298654 A | 9/2013 |

(Continued)

OTHER PUBLICATIONS

Office Action dated Oct. 14, 2019 for German Appn. No. 10 2018 220 208.7, 6 pgs.

(Continued)

*Primary Examiner* — Mark R Wendell
(74) *Attorney, Agent, or Firm* — Brooks Kushman P.C.

(57) ABSTRACT

A vehicle seat includes a foam body having a first region, a second region, a top surface, and a bottom surface, and a trench defined by and between the first and second regions. The trench includes at least one section including a narrow portion having a first width and extending downwardly into the trench from the top surface, and a base portion below the narrow portion having a second width greater than the first width. The vehicle seat further includes a trim attachment fixture disposed in the foam body below the trench, wherein the trim attachment fixture is configured to be secured to a trim cover by an attachment member disposed in the base portion.

20 Claims, 4 Drawing Sheets

(56) References Cited

U.S. PATENT DOCUMENTS

| | | | |
|---|---|---|---|
| 7,506,939 B2* | 3/2009 | Brockschneider | B60N 2/5825 |
| | | | 297/218.2 |
| 7,752,720 B2 | 7/2010 | Smith | |
| 7,837,263 B2* | 11/2010 | Booth | A47C 7/20 |
| | | | 297/218.1 |
| 7,937,815 B2* | 5/2011 | Hamilton | B60N 2/5825 |
| | | | 29/432 |
| 2003/0162008 A1* | 8/2003 | Cappucci | B29C 44/1271 |
| | | | 428/304.4 |
| 2008/0309143 A1 | 12/2008 | Booth et al. | |
| 2011/0309667 A1* | 12/2011 | Stiller | B60N 2/5825 |
| | | | 297/452.58 |
| 2012/0174352 A1* | 7/2012 | Tsunoda | B60N 2/5825 |
| | | | 24/530 |
| 2012/0187731 A1* | 7/2012 | Guadagno | B60N 2/5833 |
| | | | 297/218.2 |
| 2012/0284974 A1 | 11/2012 | Yamamoto et al. | |
| 2012/0306256 A1 | 12/2012 | Okuyama et al. | |
| 2013/0033084 A1 | 2/2013 | Sei et al. | |
| 2015/0006116 A1 | 1/2015 | Handigol et al. | |
| 2015/0130255 A1* | 5/2015 | Kheil | B60N 2/5825 |
| | | | 297/452.58 |
| 2015/0175042 A1 | 6/2015 | Galbreath et al. | |
| 2018/0099593 A1* | 4/2018 | Fujikake | A47C 31/02 |
| 2018/0229634 A1* | 8/2018 | Baisch | A47C 31/02 |
| 2019/0002272 A1* | 1/2019 | Kristo | B29D 99/0092 |

FOREIGN PATENT DOCUMENTS

| | | |
|---|---|---|
| DE | 102012207918 A1 | 11/2012 |
| JP | 2008073441 A | 4/2008 |
| JP | 2012217754 A | 11/2012 |
| JP | 2014204780 A | 10/2014 |
| WO | 2009/092153 A1 | 7/2009 |
| WO | WO2009092153 * | 7/2009 |
| WO | 2015067620 A1 | 5/2015 |

OTHER PUBLICATIONS

Office Action dated Nov. 20, 2020 for Chinese Appn. No. 2018113893991 (no English translation readily available), 7 pgs.

* cited by examiner

FIXED ATTACHMENT FOR HOG RING TIE-DOWN TRENCH

CROSS-REFERENCE TO RELATED APPLICATIONS

This application claims the benefit of U.S. provisional application Ser. No. 62/590,886, filed Nov. 27, 2017, the disclosure of which is hereby incorporated in its entirety by reference herein.

TECHNICAL FIELD

The present application is directed to a trim cover attachment in a vehicle seat cushion.

BACKGROUND

Vehicle seats having seat bottoms and seatbacks typically include foam cushions for support. Cushions may include various fixtures for attaching trim covers, thus providing stable and aesthetically pleasing appearance. To provide attachment of the trim cover, fixtures, are typically disposed below the cushion trenches, between sections of the cushion foam, such that trim attachment members, e.g. clips or hog ring tie downs, can be attached from within the trench to the fixture to secure the trim cover.

SUMMARY

According to an embodiment, a vehicle seat is disclosed. The vehicle seat includes a foam body having a first region, a second region, a top surface, and a bottom surface, and a trench defined by and between the first and second regions. The trench includes at least one section including a narrow portion extending downwardly into the trench from the top surface and having a first width, and a base portion below the narrow portion having a second width, with the second width being greater than the first width. The vehicle seat further includes a trim attachment fixture disposed in the foam body below the trench, wherein the trim attachment fixture is configured to be secured to a trim cover by a trim attachment member disposed in the base portion.

According to one or more embodiments, the trench may further include a mid-section extending between and connecting the narrow portion and base portion of the trench. Further, the mid-section may have a top end having the first width at the narrow portion, and a bottom end having the second width at the base portion. In certain embodiments, the foam body may define a window substantially free of foam between the trim attachment fixture and the base portion. In one or more embodiments, the first width may be 1 to 5 mm, and the second width may be 5 to 25 mm. In some embodiments, the base portion may have a cylindrical shape. According to one or more embodiments, the narrow portion may have a depth of 1 to 50 mm downward from the top surface, and the base portion may have a depth of 1 to 20 mm downward towards the bottom surface. In some embodiments, the vehicle seat may include at least one section per 50 to 150 mm of trench. Additionally, each section may be spaced apart from another section by 5 to 150 mm.

According to another embodiment, a vehicle seat assembly includes a foam body having a first region, a second region, a top surface, and a bottom surface, and a trench defined by and between the first and second regions. The trench has a plurality of sections, each section including a narrow portion extending downwardly into the trench from the top surface having a first width. At least one of the plurality of sections includes a corresponding base portion below the narrow portion. The base portion has a second width greater than the first width and is configured to receive an attachment member. The vehicle seat assembly further includes a trim attachment fixture disposed in the foam body below the trench, and a trim cover configured to be secured to the trim cover attachment fixture by the attachment member at the base portion at each section of the trench.

According to one or more embodiments, each section including a base portion may be spaced from another section including a base portion by 5 to 150 mm. In at least one embodiment, the attachment member may be a hog-ring tie down. In one or more embodiments, each section of the trench may further include a mid-section extending from and connecting the narrow portion to the base portion. The mid-section may have a top end having the first width at the narrow portion, and a bottom end having the second width at the base portion. In some embodiments, the base portion may have a depth of 1 to 20 mm. In at least one embodiment, the first width may be 1 to 5 mm, and the second width may be 5 to 25 mm.

According to yet another embodiment, a method of making a vehicle seat assembly is disclosed. The method includes providing a foam body having a first region, second region, and a trench defined by and between the first and second regions. The trench has at least one section including a narrow portion having a first width extending into the trench from a surface of the foam body, and a base portion below the narrow portion having a second width greater than the first width. The method further includes providing a trim attachment fixture in the foam body below the trench, and securing a trim cover to the trim attachment fixture by deploying an attachment member in the base portion of the section of the trench.

According to one or more embodiments, the trim attachment fixture may be a wire. In at least one embodiment, securing the trim cover may include applying a hog-ring tie down in the base portion and around the trim attachment fixture. In one or more embodiments, the first width may be 1 to 5 mm, and the second width may be 5 to 25 mm.

DETAILED DESCRIPTION

As required, detailed embodiments of the present disclosure are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Moreover, except where otherwise expressly indicated, all numerical quantities in this disclosure are to be understood as modified by the word "about" in describing the broader scope of this disclosure. Practice within the numerical limits stated is generally preferred. Also, unless expressly stated to the contrary, the description of a group or class of materials by suitable or preferred for a given purpose in connection with the disclosure implies that mixtures of any two or more members of the group or class may be equally suitable or preferred.

Figure 1A:
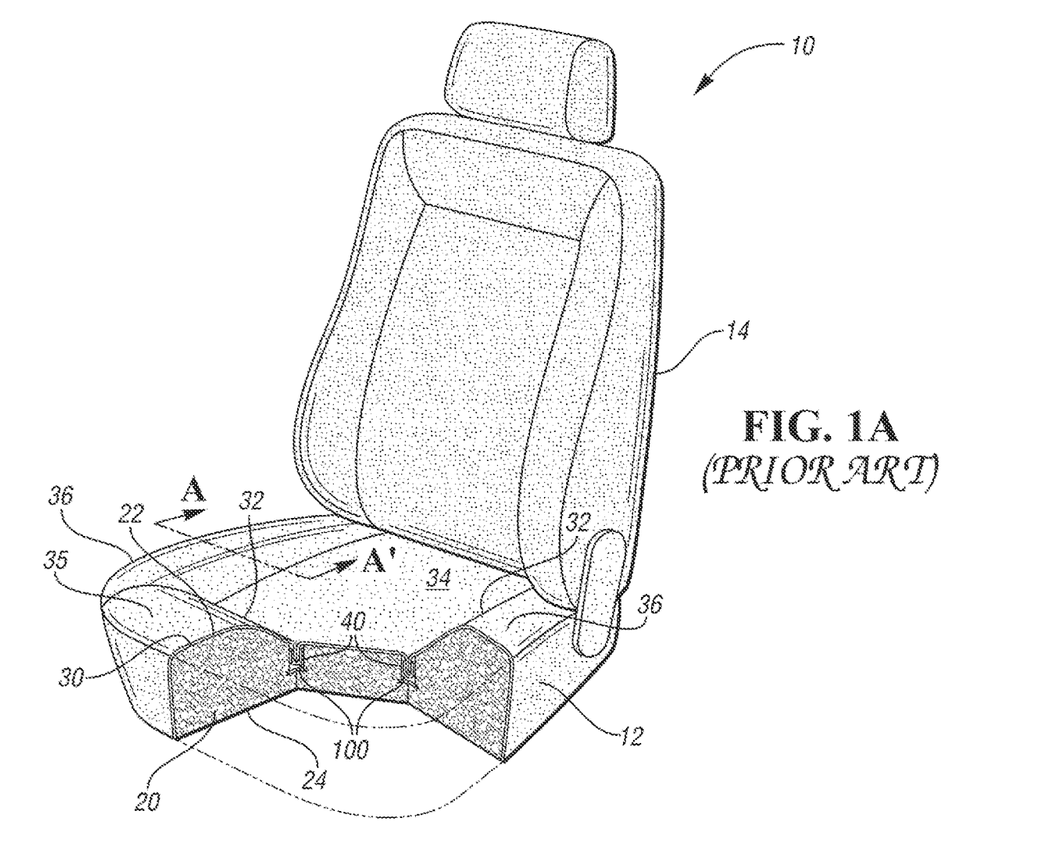
FIG. 1A is a perspective schematic view of a conventional seat assembly.

Referring to FIG. 1A, a conventional vehicle seat assembly 10 is shown. The seat assembly 10 includes a seat bottom 12 and a seat back 14. The seat assembly 10 is shown having a bucket type configuration, but it should be understood that any structure and/or appearance is contemplated. The seat bottom 12 and seat back 14 may be made in a similar manner, and include a foam member 20, and thus may be referred to interchangeably as a vehicle seat cushion. The foam member 20 may be any suitable foam, such as, but not limited to, polyurethane foam. The foam member 20 has an upper or A-surface 22, facing upwards and serves as a seating surface for an occupant, and a lower surface 24 facing downward toward a floor of a vehicle when the seat assembly 10 is installed. The A-surface 22 may be covered by a trim cover 30. The trim cover 30 may be any suitable material for covering and protecting the A-surface 22, while providing an aesthetic appearance. Examples of suitable material for the trim cover 30 include leather, vinyl or other polymers, cloth, or other suitable materials.

As shown in FIG. 1A, the trim cover 30 may include a central panel 34, a front panel 35, and side bolster panels 36 defined by seams 32 therebetween. In conventional seat assembly 10, at least one, and typically a plurality of trim attachment members, schematically shown as 40 in FIG. 1, are used to attach the trim cover 30 to the foam member 20. The trim attachment members 40 draw the seams 32 inwardly into the foam member 20 to provide an aesthetic appearance to the trim cover 30. The foam member 20 may include at least one opening (or conventional trench) 100 extending into the foam member 20 from the A-surface 22, and capable of receiving the trim attachment members 40 and trim cover 30. The opening 100 is a recess, such as an elongated channel or a trench formed in the foam member 20 such that the seams 32 may be inserted therein for attachment at the trim attachment members 40.

Figure 1B:
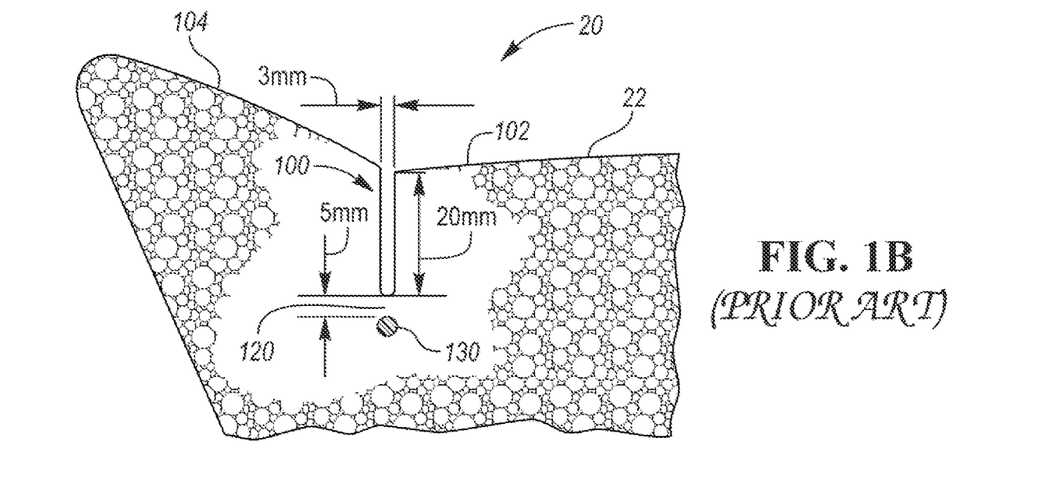
FIG. 1B is a partial schematic cross-section of a conventional vehicle seat design taken along line A-A'.

Referring to FIG. 1B, the conventional trench 100 of FIG. 1A is schematically shown taken along line A-A' of FIG. 1A. The conventional trench 100 is an area defined between two sections 102, 104 of foam member 20. The conventional trench 100 is free, or substantially free, of foam and may include a trim cover (shown in FIG. 1A) secured to the seat cushion by attachment members 40 (shown in FIG. 1A) in the trench 100 to enhance appearance of the vehicle seat. The conventional trench 100 is narrow at the top or A-surface 22 of the foam member 20, having a typical width of 1 to 5 mm. The depth of the conventional trench is typically 20 mm, and is defined as extending downward from the A-surface 22 into foam member 20. A trim attachment fixture 130, such as a wire for attaching a trim cover via a hog ring tie down or other attachment member, embedded in the foam member 20 below the trench 100. The trim attachment fixture 130 is typically embedded at a depth below the trench 100 of 1 to 5 mm. The width of the trench 100 is narrow, including at a base 120, defined as the deepest portion of conventional trench 100. The trim cover attachment fixture 130 typically has a diameter of 4 mm.

Figure 2A:
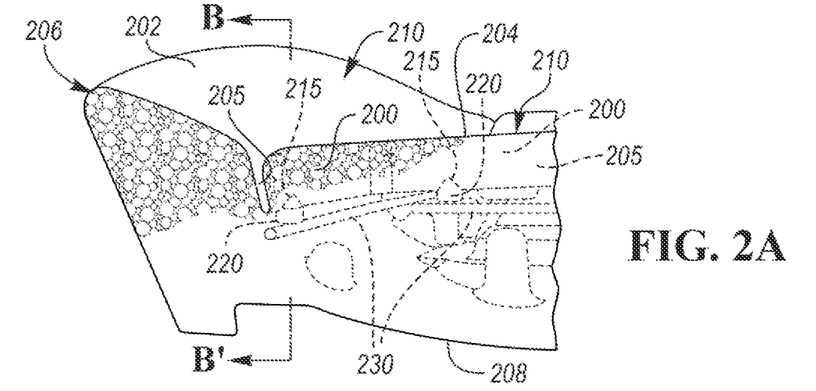
FIG. 2A is a partial perspective view of a seat cushion with a trench design according to an embodiment of the present disclosure.
Figure 2B:
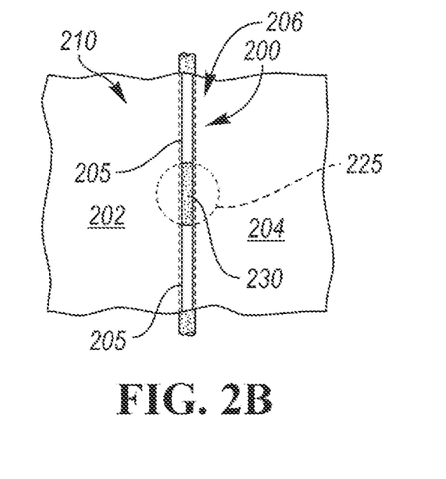
FIG. 2B is a partial schematic top view of an A-surface of the vehicle seat cushion of FIG. 2A.
Figure 2C:
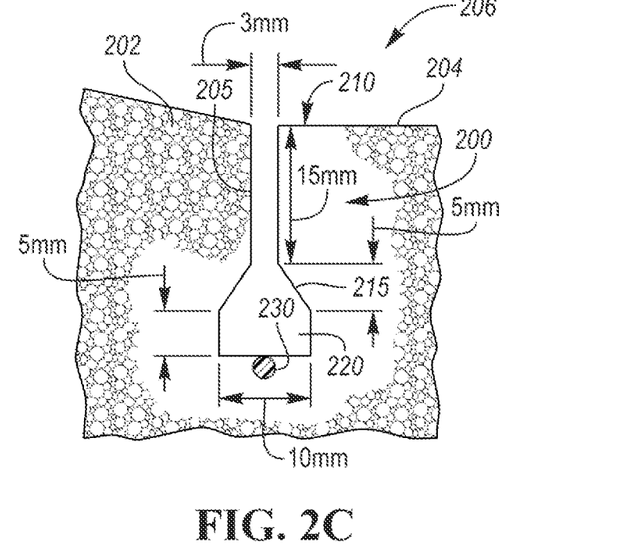
FIG. 2C is a partial schematic cross-section taken along B-B' of FIG. 2A.

Referring to FIGS. 2A, 2B, and 2C, partial perspective, top, and cross-section views, respectively, of a seat trench 200 are shown, according to an embodiment of the present disclosure. The trench 200 is an area defined between two sections 202, 204 of a foam body 206 of a vehicle seat (hereinafter interchangeably referred to as seat cushion or foam body). The foam body 206 can be made of any suitable foam, such as, but not limited to, polyurethane foam. Moreover, the foam body 206 could be made of one material, or two or more materials, e.g. two different types of foam. It should be understood that the foam is shown cut away in the Figures so the reference numerals can be more clearly seen. For clarity, the width of the trench 200 may be shown enlarged, but it should be understood that the trench 200 may be any size or be located in different regions of the cushion 206. The trench 200 may not extend fully downward through the foam body 206 all the way to the bottom surface 208. Trench 200 may be integrally formed in the foam body 206, such as by molding, or any other suitable process. However, the trench 200 may also be formed between multiple foam body 206 portions or layers. A wire 230 for attaching a trim cover (referred to interchangeably as a trim attachment fixture) is disposed in the foam body 206 below the trench 200 (towards bottom surface 208), for securing a trim cover to the wire 230 via an attachment member (e.g., a clip or hog ring tie down) in the trench 200. Although a wire 230 is shown, it should be understood that any suitable fixture may be used to secure a trim cover.

In at least one embodiment, as illustrated in FIGS. 2A-C, the trench 200 is narrow at the top or A-surface 210 of foam body 206, and has a narrow section 205 extending downward into the trench 200 towards a bottom surface 208. The width of trench 200 is defined as the distance formed between sections 202, 204 of the foam body 206. The width of narrow section 205 may be, in some embodiments, 1 to 10 mm, in other embodiments 2 to 8 mm, and in yet another embodiment 3 to 5 mm. In at least one embodiment, trench 200 includes portions 225 which include a base portion 220 below the narrow section 205. Generally, in one or more embodiments, portions 225 are parts of the trench 200 where the trim cover will be secured. In certain embodiments, as shown in FIG. 2B, the portion 225 with the base portion 220 provides a window where the trim attachment fixture 230 is exposed to the trench 200 such that there is no foam between the wire 230 and the window formed by the base portion 220. In other embodiments, the wire 230 is embedded in foam body 206, but the depth of trench 200 having the base portion 220 includes less foam between the trench 200 and the wire 230 when compared to a conventional seat cushion, thus lowering the resistance of foam during attachment member deployment. The base portion 220 is configured to receive an attachment member and a bead of a trim cover, such that the trim cover can be secured to the wire 230 and cover the foam body 206.

Figure 4A:
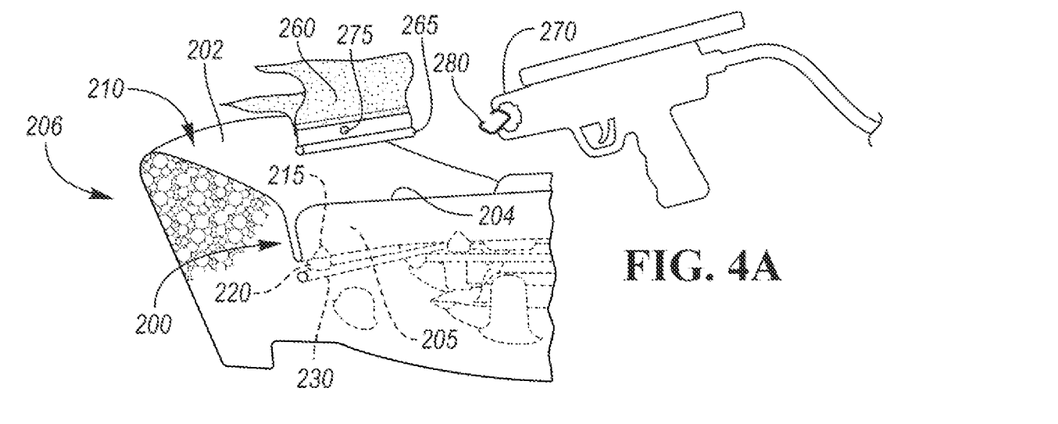
FIGS. 4A-C show partial schematic views of a trim cover attachment system as the trim cover is secured according to an embodiment of the present disclosure.

Referring again to FIGS. 2A-C, although only one portion 225 is shown in FIG. 2C, it should be understood, as shown in FIG. 2A having multiple wires 230 and base portions 220, that the foam body 206 may include any number of portions 225 with base portions 220 needed to attach a trim cover (shown as trim cover 260 in FIG. 4A). For instance, in an embodiment, the foam body 206 includes one portion 225 per 50 to 150 mm of trench 200, in another embodiment one portion per 75 to 125 mm of trench 200, and in yet another embodiment, one portion per 85 to 115 mm of trench 200. In another embodiment, to secure a trim cover, there may be one portion per every 90 to 110 mm of trench. In at least one embodiment, the portions 225 may be spaced 5 to 150 mm apart, in another embodiment, 15 to 130 mm apart, and in other embodiments 25 to 115 mm apart. Furthermore, each portion 225, in some embodiments, is a section along the length of the trench 200 extending along the A-surface 210, independently, for 5 to 20 mm, in other embodiments 7 to 15 mm, and in yet other embodiments 8 to 12 mm. In certain embodiments, each portion 225 is a section along the length of the trench 200 extending along the A-surface 210 for 10 mm.

Figure 4B:
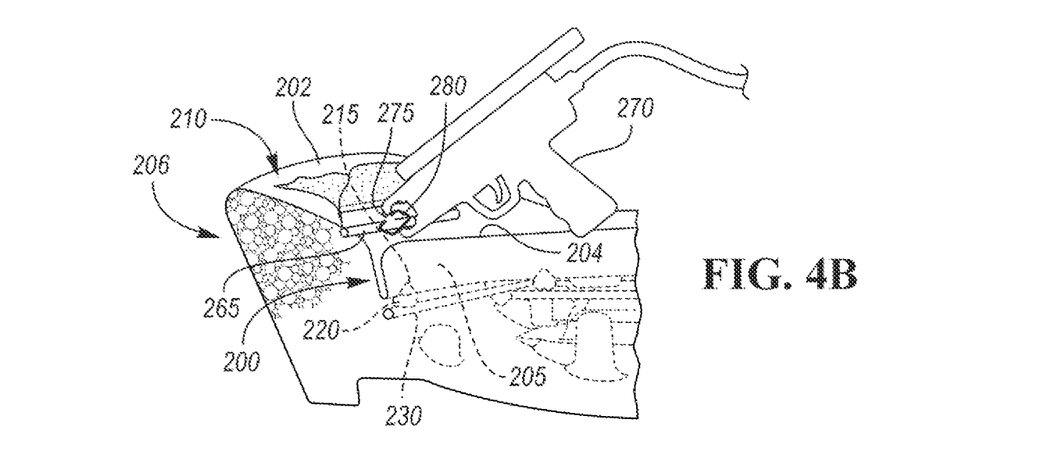
Figure 4C:
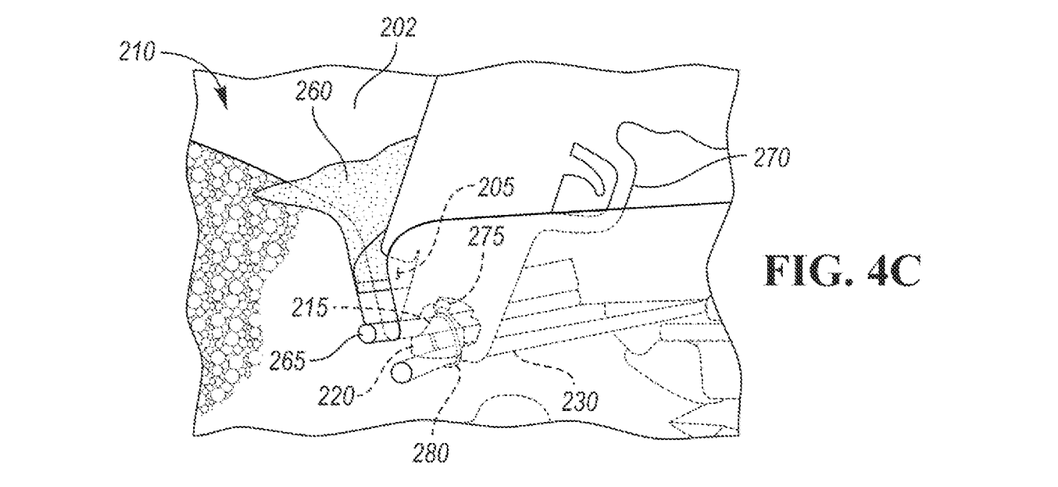

Portion 225 (or section 225) is a section of the trench configured to receive a trim cover attachment member (or attachment member) at the base portion 220 for securing a trim cover to the fixture (as shown in FIGS. 4A-C). In certain embodiments, the trim cover may be attached at various locations throughout the trench 200, as shown in FIG. 2A, having multiple base portions 220. As discussed in more detail below, in FIGS. 4A-C, the base portion 220 is configured to receive an attachment member 280 and a bead 265 of a trim cover 260, such that the trim cover 260 can be secured to the wire 230 and cover the foam body 206. The trench 200 and base portion 220 provide space for an attachment tool 270 to enter with the trim cover 260 and secure the trim cover 260 to the wire 230 with an attachment member 280, without being restricted by foam at the sides and below the base 220 of the trench 200, as shown in FIGS. 4A-C. In some embodiments, base portion 220 may have a cylindrical shape. Although shown in the Figures as cylindrical, it should be understood that any suitable shape providing a wider access point for the attachment tool is contemplated.

FIG. 2C is a cross section of trench 200 taken along B-B' of FIG. 2A, illustrating the base portion 220, with wire 230 accessible below the trench. The trench 200 at portion 225 includes a narrow section 205 extending down from the A-surface 210. The narrow section 205 of trench 200 extends down into the foam body any suitable depth based on the desired shape of the cushion components and aesthetic appearance of the trim cover. The narrow section 205 in some embodiments may have a depth of 1 mm to 50 mm, in other embodiments, a depth of 5 to 40 mm, and in yet another embodiment, 10 to 30 mm, where depth is measured downward from the end closest to the A-surface 210, and towards the bottom surface 208 of the foam body 206. In at least one embodiment, the base portion 220, below the narrow section 205 of the trench 200, has a depth and width capable of receiving an attachment member, such as, but not limited to, a hog-ring tie down, to attach a trim cover to the wire 230. In some embodiments, the depth of the base portion 220 is 1 to 20 mm, in other embodiments 2 to 15 mm, or in some other embodiments, 3 to 10 mm. The base 220 has a width wider than the narrow section 205, for example, of 5 to 25 mm, in other embodiments, 7 to 20 mm, and in yet other embodiments, 8 to 15 mm, allowing for the attachment tool to open and secure a trim cover to the trim cover attachment fixture or wire 230 by the attachment member in the base portion 220. The trim cover attachment fixture or wire 230, having a diameter of 1 to 5 mm, is disposed below the base portion of the trench 220 and, in some embodiments, is exposed to the base portion 220, thus providing easy attachment of a trim cover to wire 230 at the portion 225 of the trench 200, as the attachment tool can open in the wide base 220 without resistance from foam body 206. Additionally, with the window exposing wire 230 to the base 220, the attachment member can easily access the wire 230 without having to pierce into foam. In other embodiments, where the wire is embedded into the foam body 206 below the base 220, there is substantially less foam below the wide base 220 when compared to a conventional trench, because of the presence of base portion 220 below the narrow portion 205. As such, the attachment tool meets relatively substantially less resistance as compared to a conventional trench. In at least one embodiment, the foam below the base 220 has a depth of 0.01 to 5 mm, in some embodiments of 0.1 to 4 mm, and in other embodiments of 0.25 to 3 mm. The wide base portion 220 at portion 225 provides space such that a hog ring gun, or other attachment tool, can attach a hog ring or other trim attachment member to the trim cover attachment fixture 230. Furthermore, base portion 220 provides a deeper trench for access to the fixture 230, reducing the resistance from the foam body 206 which would conventionally have more foam between the bottom of the trench and wire providing resistance to the attachment tool. The narrow section 205 thus limits visibility of the connection point between the attachment member and fixture 230 because of the narrow width at the A-surface 210. As such, a hog ring gun, or other attachment tool, can attach the trim cover more easily.

Although only two are pictured in FIG. 2A, it should be appreciated that there may be any number of sections 225 of the trench 200 having base portions 220 along the length of the trench to serve as attachment points. For example, similar to the above discussed frequency and spacing, in some embodiments, there may be about one portion 225 having a base 220 per every 90 to 110 mm of the trench 200. The bases 220 may be spaced out by, for example, 1 to 150 mm in some embodiments, 10 to 100 mm in other embodiments, or 15 to 50 mm in yet another embodiment. The trench 200 may be located at various positions in the cushion 206, and include sections 225 with bases 220 along any trench 200. Similarly, the seat cushion 206 may have any number of trenches 200 as suitable based on the desired seat design. Furthermore, referring again to FIG. 2A, any number of wires 230 can be disposed below any number of base portions 220, under different trenches 200 of the vehicle seat. As such, the trench 200 need not be continuous, and any number of trenches 200 with base portions 220 and fixtures 230 for trim attachment may be used depending on seat design.

Furthermore, as illustrated in some embodiments, such as FIGS. 2A, 3 and 4A-C, the trench 200 may have a greater depth at the portions with base portion 220 than the portions of the trench between sections 225. As such, in sections of the trench 200 without base portion 220, the trench 200 may only have a depth into the foam body 206 of the narrow portion 205 of section 225. For example, without a base 220, in some embodiments the trench 200 may have a depth of 1 mm to 50 mm, in other embodiments, a depth of 5 to 40 mm, and in yet another embodiment, 10 to 30 mm. In other embodiments, although not shown, sections without base 220 may still have the depth of the portions 225 with a base portion 220. Thus, in certain embodiments, the narrow portion 205 may extend to the depth of the base portion 220, but maintain the width of the narrow portion 205, as no attachment member may be required at those sections of the trench 200. For example, in certain embodiments the sections without base 220 may have a depth of 2 to 70 mm, in other embodiments 2 to 60 mm, or in some other embodiments, 3 to 50 mm. In some embodiments, the depth of the narrow portion 225 in sections without base 220 will have the same depth as sections 225. In other embodiments, the entire trench may include a continuous base portion 220 below the narrow portion 205, extending over the length of the trench 200 in the foam body 206 to provide a wider base for the attachment tool to secure the trim cover.

Additionally, in some embodiments, the trench 200 may include a mid-section 215 at the sections 225, extending between the narrow section 205 and the base 220. The width of the mid-section may vary from top (at the narrow section 205) to the bottom (at the base portion 220). The mid-section 215 may have a depth of 1 to 10 mm, in some embodiments a depth of 2 to 7 mm, and in yet another embodiment 3 to 5 mm. In some embodiments, the width at the top of the mid-section 215 to the bottom of mid-section 215 is based on the width of the narrow section 205 (at the top) and the width of the base 220 (at the bottom), respectively.

Figure 3:
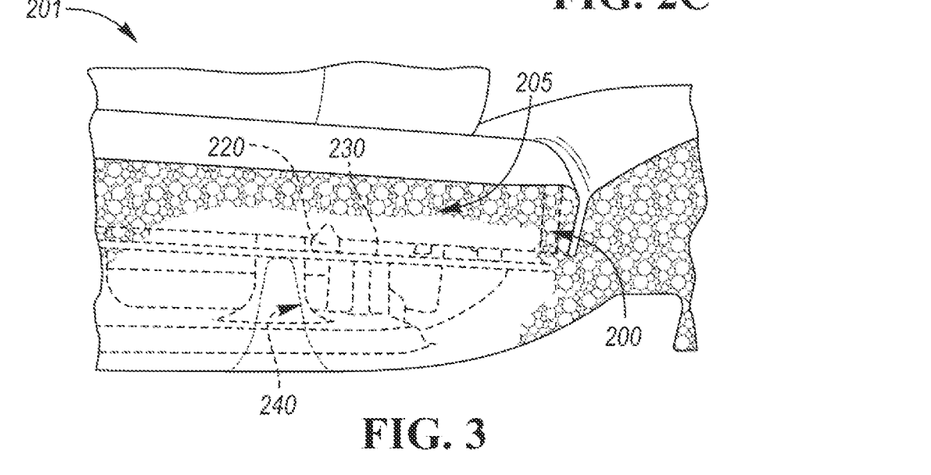
FIG. 3 is a partial perspective view of a vehicle seat assembly according to an embodiment of the present disclosure.

Referring to FIG. 3, a perspective view of a trim cover attachment system 201, according to an embodiment of the present disclosure, is shown. The system 201 includes the trench 200 of the cushion 206, having a narrow section 205 of the trench, and a base portion 220, as formed as a wider section of trench 200 as compared to the narrow region 205. Below the base portion 220, is a trim attachment fixture, such as wire 230. The system 201 includes a support 240 for the wire 230. The support 240 may be a finger pocket cone for providing support to the wire 230 during hog ring attachment. The support 240 may be offset from the base portion 220 along the longitudinal axis of wire 230, in some embodiments, by 1 to 50 mm, in other embodiments 5 to 40, and in yet another embodiment, 10 to 30 mm. There may be any suitable number of supports 340 as required to support the wire 230 during attachment. For example, in an embodiment, there may be one support 240 per base portion 220, and in another embodiment, one support 240 per every two base portions 220, and so on. Furthermore, the supports 240 may be spaced out any suitable amount to provide support for the wire 230 during attachment. As such, in some embodiments, the supports 240 may be spaced out the same distance the base portions 220 are spaced out. In other embodiments, the supports 240 may be spaced 1 to 150 mm apart, and in yet another embodiment 10 to 100 mm apart. In some embodiments, the base portion 220 provides a window for accessing the wire 230 by an attachment tool, such as a hog ring gun, for securing a trim cover, and the wire 230 is supported by support 240 during trim cover attachment.

FIGS. 4A-C show partial schematic views of an embodiment of a trim attachment system for securing a trim cover 260 to a seat cushion 206. Trench 200 is defined in the A-surface 210 of foam body 206, separating two regions 202, 204 of the foam body 206. The trench 200 includes narrow section 205, extending down into the foam body 206 from the A-surface 210. The trench 200 includes a base portion 220 at the bottom of the trench 200, and mid-section 215 extending between the narrow section 205 and the base portion 220. The mid-section has a first width at an end closer to the A-surface 210, and a second width, wider than the first, downward into the trench towards the base portion 220, such that the base portion 220 can accommodate an attachment member 280 for attaching a trim cover 260 to the trim attachment fixture 230. The trim cover attachment fixture 230, such as wire 230, is disposed in the foam body 206 at the base portion 220 and, in some embodiments, may be exposed to the trench 200 at base portion 220. Although side bolster 202 and insert 204 are shown in the illustrated embodiment, the trench 200 may divide any two regions or portions of a foam body 206 in a vehicle seat.

Referring again to FIGS. 4A-C, schematic illustrations of the attachment of trim cover 260 to the wire 230 at the base portion 220 of trench 200 by attachment tool 270 are shown. Attachment tool 270 may be, for example, a hog ring gun, for deploying attachment member 280 (e.g., hog rings or clips). The attachment spot 275 of the seat trim cover 260 is where the hog ring gun 270 secures the cover to the wire 230 by attachment member 280. Attachment tool 270 enters the trench 200 at the A-surface 210 with the trim cover 260 at the attachment spot 275, and pushes into the trench 200 to reach the base portion 220. At base portion 220, the attachment tool 270 opens to secure the trim cover bead 265 to the wire 230. By having the wide base 220, the attachment tool 270 has additional space for deploying the attachment member 280 because of less resistance from the foam body 206 when opening, and for reaching the wire 230, without compromising the narrow trench appearance at the A-surface 210. As such, the trim cover beads 265 and attachment members 280 may not be visible at the A-surface since the trench design at the seat cushion surface is narrow (based on the width of narrow section 205).

Figure 5A:
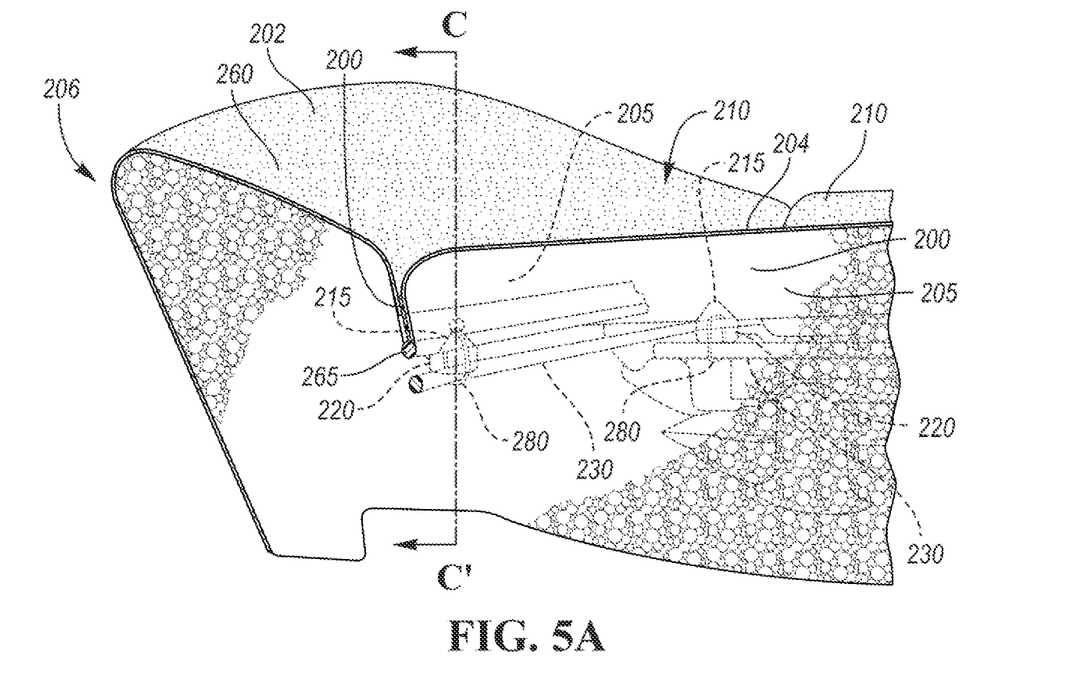
FIG. 5A is a partial perspective view of a seat cushion with a trench design according to an embodiment of the present disclosure.
Figure 5B:
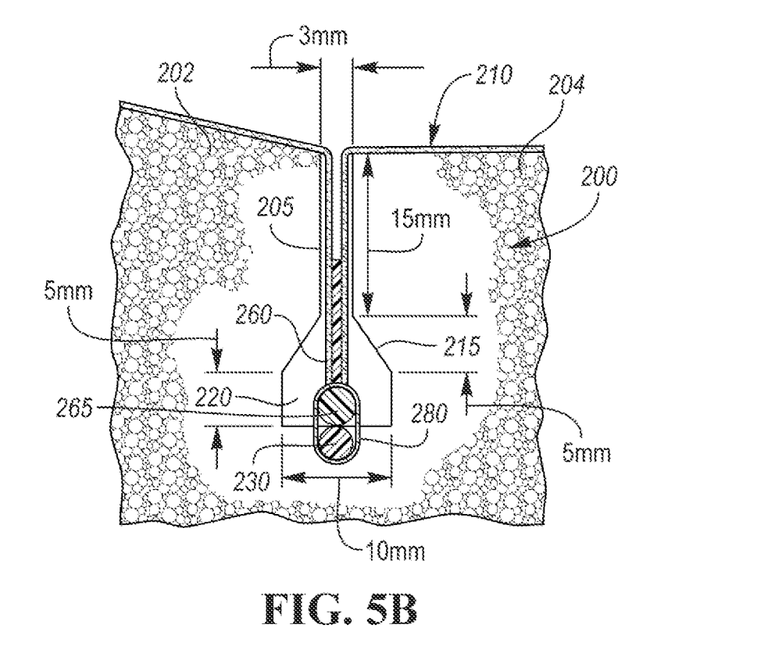
FIG. 5B shows a partial schematic cross-section taken along C-C' of FIG. 5A.

FIGS. 5A-B show a partial schematic view of a seat cushion 206 with a trim cover 260 secured, and a partial schematic cross-section of the trench 200 taken along line C-C', respectively, according to an embodiment of the present disclosure. Referring to FIG. 5A, foam body 206 includes trench 200 between sections 202, 204 of the foam body 206. Trench 200 extends into the foam body 206 from A-surface 210. Trench 200 includes a trim attachment fixture 230, or wire 230, below the trench in the foam for securing a trim cover 260. Although a wire 230 is shown, it should be appreciated that other fixtures may be used. Trench 200 includes a narrow section 205 from the A-surface 210 down a certain depth, e.g., 15 mm as shown as an example in FIG. 5B. At various sections of the trench 200, a base portion 220 is provided below the narrow section 205 to facilitate attachment of a trim cover 260 at the base portion 220 to the wire 230. Although there is a mid-section 215 in the illustrated embodiment between narrow portion 205 and base portion 220, it should be understood that the narrow portion 205 may have the base portion 220 directly underneath the narrow portion 205, without mid-section 215 providing a gradual increase in width. An attachment member 280 (e.g., a clip or hog ring tie down) is secured around the wire 230 and a bead 265 of the trim cover 260 at the base portion 220, such that the trim cover 260 covers the seat cushion 206. In certain embodiments, as illustrated in FIG. 5B, the top portion of the attachment member 280 is in the base portion 220 over bead 265, while the bottom portion of attachment member 280 loops around the wire 230 in the foam body 206. The attachment member 280 is deployed by the attachment tool entering the trench 200 with the trim cover 260, and securing the trim cover bead 265 and wire 230 together at the base portion 220.

As illustrated in the embodiment shown in FIG. 5A, there may be a plurality of base portions 220 located at various sections of the trench for securing the trim cover 260. It should be appreciated that there may be any number of base portions 220 having the wire 230 connected to the trim cover 260 by a hog ring 280 around the wire 230 and the bead 265 of the trim cover 260. The bead 265 of the trim cover 260 may have slight bowing from base portion 220 to base portion 220, which is slight and does not impact the aesthetic of the trim cover 260, due to the base portions 220 being at a lower depth in the trench 220 than at other portions of the trench 220.

The present disclosure relates to a vehicle seat foam body defining a trench having a wide base region for attaching a trim cover, while having a narrow width at the surface of the cushion. The base region provides a space for an attachment fixture to be easily accessed by an attachment tool, such as a hog ring gun, to secure a trim cover to a trim attachment fixture disposed below the trench via an attachment member (e.g., a hog ring tie down). The wide base region further provides limited foam resistance because of the additional space for the attachment tool to open and close, and a deeper location in the trench to lessen foam resistance when securing the attachment member around the trim cover and fixture. Therefore, the trench design provides easy and secure attachment of the trim cover, while still achieving proper appearance with the narrow trench at the seat cushion upper surface.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle seat cushion comprising:
    a foam body having a first region and a second region, the foam body having a top surface and a bottom surface;
    a trench defined by and between the first and second regions of the foam body, the trench being continuous and having uniform cross-section portions along the trench and at least one non-uniform section disposed between the uniform cross-section portions, each of the at least one non-uniform section including a narrow portion extending downwardly into the trench from the top surface, the narrow portion having a first width, and a base portion below the narrow portion having a second width, the second width being greater than the first width, and each of the uniform cross-section portions including the narrow portion to be continuous with the non-uniform section and having a uniform width of the first width throughout the depth of the uniform cross-section portions, the non-uniform section having a greater depth from the top surface than the depth from the top surface of the uniform cross-section portions; and
    a trim attachment fixture disposed in the foam body below the trench,
    wherein the trim attachment fixture is configured to be secured to a trim cover by a trim attachment member disposed in the base portion, and the non-uniform sections are discrete attachment windows between uniform cross-section portions.

2. The vehicle seat cushion of claim 1, wherein the non-uniform section further includes a mid-section extending between and connecting the narrow portion and base portion of the trench.

3. The vehicle seat cushion of claim 2, wherein the mid-section has a top end having the first width at the narrow portion, and a bottom end having the second width at the base portion.

4. The vehicle seat cushion of claim 1, wherein the first width is 1 to 5 mm, and the second width is 5 to 25 mm.

5. The vehicle seat cushion of claim 1, wherein the foam body defines a window substantially free of foam between the trim attachment fixture and the base portion.

6. The vehicle seat cushion of claim 1, wherein the base portion has a cylindrical shape.

7. The vehicle seat cushion of claim 1, wherein the narrow portion has a depth of 1 to 50 mm downward from the top surface, and the base portion has a depth of 1 to 20 mm downward towards the bottom surface.

8. The vehicle seat cushion of claim 1, wherein the vehicle seat includes at least two non-uniform sections, with one non-uniform section per 50 to 150 mm of trench.

9. The vehicle seat cushion of claim 8, wherein each non-uniform section is spaced apart from another section by 5 to 150 mm.

10. The vehicle seat of claim 1, wherein the vehicle seat includes at least three non-uniform sections, with each non-uniform section is spaced apart from another section by 5 to 150 mm.

11. A vehicle seat assembly comprising:
    a foam body having a first region and a second region, the foam body having a top surface and a bottom surface;
    a continuous trench defined by and between the first and second regions of the foam body, the trench having a plurality of uniform sections, each uniform section including a narrow portion extending downwardly into the trench from the top surface of the foam body, the narrow portion having a first width throughout a uniform section depth, and at least one attachment section between uniform sections, each attachment section including the narrow portion throughout the uniform section depth to form the continuous trench between uniform and attachment sections, and including a corresponding base portion below the narrow portion such that each attachment section has a depth greater than the depth of the uniform section from the top surface as defined by a base portion depth, the base portion having a second width and configured to receive an attachment member, the second width being greater than the first width; and
    a trim attachment fixture disposed in the foam body below the trench; and
    a trim cover configured to be secured to the trim attachment fixture by the attachment member at the base portion at each section of the trench.

12. The vehicle seat assembly of claim 11, wherein each attachment section including a base portion is spaced from another attachment section including a base portion by 5 to 150 mm.

13. The vehicle seat assembly of claim 11, wherein the attachment member is a hog-ring tie down.

14. The vehicle seat assembly of claim 11, wherein each attachment section of the trench further includes a mid-section extending from and connecting the narrow portion to the base portion.

15. The vehicle seat assembly of claim 14, the mid-section has a top end having the first width at the narrow portion, and a bottom end having the second width at the base portion.

16. The vehicle seat assembly of claim 11, wherein the base portion has a depth of 1 to 20 mm.

17. The vehicle seat assembly of claim 11, wherein the first width is 1 to 5 mm, and the second width is 5 to 25 mm.

18. A method of making a vehicle seat assembly, the method comprising:

providing a foam body having a first region, second region, and a continuous trench defined by and between the first and second regions, the continuous trench including a narrow portion extending into the trench from a surface of the foam body, the narrow portion defining a plurality of uniform sections along the trench having a first width throughout a uniform section depth, and defining at least one attachment section between uniform sections, each of the at least one attachment section including a base portion below the narrow portion having a second width and configured to receive an attachment member, the second width being greater than the first width, and the depth from the top surface of each of the at least one attachment section is greater than the depth from the top surface of the uniform section;

providing a trim attachment fixture in the foam body below the trench, the trim attachment fixture being a wire; and securing a trim cover to the trim attachment fixture by deploying the attachment member in the base portion of the section of the trench.

19. The method of claim 18, wherein securing the trim cover includes applying a hog-ring tie down in the base portion and around the trim attachment fixture.

20. The method of claim 18, wherein the first width is 1 to 5 mm, and the second width is 5 to 25 mm.

* * * * *

UNITED STATES PATENT AND TRADEMARK OFFICE
CERTIFICATE OF CORRECTION

PATENT NO. : 10,933,786 B2  
APPLICATION NO. : 16/162484  
DATED : March 2, 2021  
INVENTOR(S) : Timothy Krause et al.

Page 1 of 1

It is certified that error appears in the above-identified patent and that said Letters Patent is hereby corrected as shown below:

In the Claims

Column 10, Line 29, Claim 10:
After "with each non-uniform section"
Delete "is"

Signed and Sealed this  
Third Day of August, 2021

Drew Hirshfeld  
*Performing the Functions and Duties of the*  
*Under Secretary of Commerce for Intellectual Property and*  
*Director of the United States Patent and Trademark Office*